(12) United States Patent
Otto et al.

(10) Patent No.: US 9,056,565 B2
(45) Date of Patent: Jun. 16, 2015

(54) DEVICE FOR LOCKING AND UNLOCKING A FIRST HARDWARE COMPONENT AND A SECOND HARDWARE COMPONENT, PARTICULARLY OF A MOTOR VEHICLE SEAT, RELATIVE TO EACH OTHER

(75) Inventors: Juergen Otto, Burscheid (DE); Ingo Kienke, Wermelskirchen (DE); Andreas Schug, Oberhausen (DE)

(73) Assignee: JOHNSON CONTROLS GMBH, Burscheid (DE)

( * ) Notice: Subject to any disclaimer, the term of this patent is extended or adjusted under 35 U.S.C. 154(b) by 49 days.

(21) Appl. No.: 13/320,152

(22) PCT Filed: May 12, 2010

(86) PCT No.: PCT/EP2010/002928
§ 371 (c)(1),
(2), (4) Date: Dec. 7, 2011

(87) PCT Pub. No.: WO2010/130434
PCT Pub. Date: Nov. 18, 2010

(65) Prior Publication Data
US 2012/0093577 A1  Apr. 19, 2012

(30) Foreign Application Priority Data

May 12, 2009 (DE) .......................... 10 2009 020 953
Jul. 10, 2009 (DE) .......................... 10 2009 032 904

(51) Int. Cl.
B25G 3/18 (2006.01)
B60N 2/235 (2006.01)

(52) U.S. Cl.
CPC ............. *B60N 2/2356* (2013.01); *Y10T 403/59* (2015.01); *Y10T 403/591* (2015.01); *Y10T 403/32418* (2015.01); *Y10T 403/32368* (2015.01)

(58) Field of Classification Search
CPC ................. B60N 2/235; B60N 2/2356; Y10T 403/32368; Y10T 403/32418; Y10T 403/591
USPC ........ 297/361.1, 366, 367 P, 363; 403/83, 97, 403/101, 322.1, 84, 103, 104, 164
See application file for complete search history.

(56) References Cited

U.S. PATENT DOCUMENTS 5,590,931 A * 1/1997 Fourrey et al. ................. 297/366
5,857,746 A * 1/1999 Barrere et al. ............ 297/367 R
(Continued)

FOREIGN PATENT DOCUMENTS

DE 39 23 966 A1 2/1991
DE 695 00 872 T2 3/1998
(Continued)

OTHER PUBLICATIONS

German Examination Report dated Jul. 15, 2010 as received in corresponding German Application No. 102009032904.8-14, 4 pages.
(Continued)

*Primary Examiner* — Michael P Ferguson
*Assistant Examiner* — Matthew R McMahon
(74) *Attorney, Agent, or Firm* — Foley & Lardner LLP

(57) ABSTRACT

A device locks and unlocks a first hardware component and a second hardware component relative to each other, particularly for a motor vehicle seat. The first hardware component and the second hardware component form a housing having an interior and are disposed on a common axis. At least one latching device is disposed in a first plane perpendicular to the axis and at least one second latching device is disposed in a second plane also perpendicular to the axis and displaced along the axis relative to the first plane. The first latching device comprises a first latch and first retaining cam and the second latching device comprises a second latch and a second retaining cam.

9 Claims, 5 Drawing Sheets

(56) References Cited

U.S. PATENT DOCUMENTS

| | | | | |
|---|---|---|---|---|
| 6,007,153 | A | * | 12/1999 | Benoit et al. ............. 297/378.12 |
| 6,082,821 | A | * | 7/2000 | Baloche et al. ........... 297/354.12 |
| 6,112,370 | A | * | 9/2000 | Blanchard et al. ............. 16/325 |
| 6,652,031 | B2 | * | 11/2003 | Villarroel et al. ......... 297/367 R |
| 6,805,513 | B2 | | 10/2004 | Marquina .................... 403/107 |
| 6,908,156 | B1 | * | 6/2005 | Park et al. ..................... 297/366 |
| 6,918,635 | B2 | * | 7/2005 | Finner et al. ................. 297/362 |
| 7,367,740 | B2 | * | 5/2008 | Lazic et al. ..................... 403/97 |
| 7,475,945 | B2 | * | 1/2009 | Reubeuze et al. ........ 297/367 R |
| 7,648,204 | B2 | * | 1/2010 | Oki .......................... 297/367 L |
| 7,784,872 | B2 | * | 8/2010 | Kienke et al. ............. 297/367 P |
| 7,828,386 | B2 | * | 11/2010 | Reubeuze et al. ........ 297/367 P |
| 8,251,451 | B2 | * | 8/2012 | Dziedzic ................... 297/367 P |
| 2006/0082204 | A1 | * | 4/2006 | Zhang .......................... 297/366 |
| 2008/0203798 | A1 | * | 8/2008 | Kienke et al. ................. 297/367 |
| 2009/0066138 | A1 | * | 3/2009 | Reubeuze et al. ............ 297/367 |
| 2010/0096897 | A1 | * | 4/2010 | Kienke et al. ............. 297/367 R |
| 2010/0117429 | A1 | * | 5/2010 | Mitsuhashi ............. 297/354.12 |

FOREIGN PATENT DOCUMENTS

| | | |
|---|---|---|
| DE | 698 04 370 T2 | 11/2002 |
| DE | 699 08 135 T2 | 4/2004 |
| DE | 1020040 47 420 B4 | 4/2007 |
| EP | 0 691 238 A1 | 1/1996 |
| FR | 2920713 A1 | 3/2009 |

OTHER PUBLICATIONS

International Search Report dated Sep. 9, 2010 as received in corresponding PCT Application No. PCT/EP2010/002928, 2 pages.

English Translation of International Preliminary Report on Patentability dated Dec. 12, 2011 as received in corresponding PCT Application No. PCT/EP2010/002928, 8 pages.

German examination report received in connection with German application No. DE 10 2009 032 904.8; dtd Feb. 28, 2013, 6 pages.

* cited by examiner

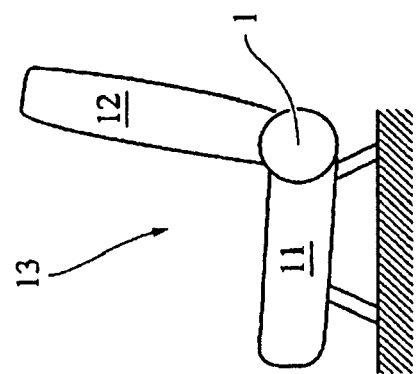
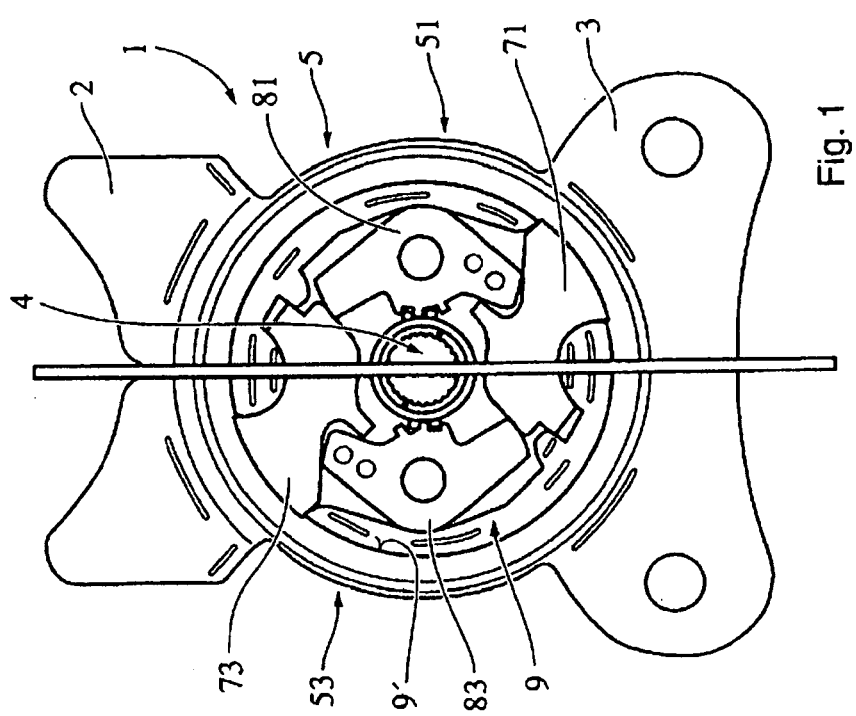

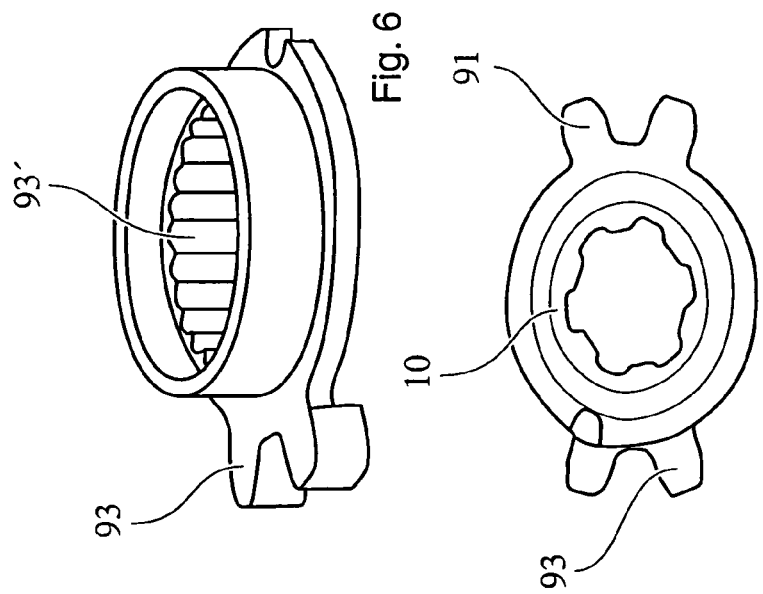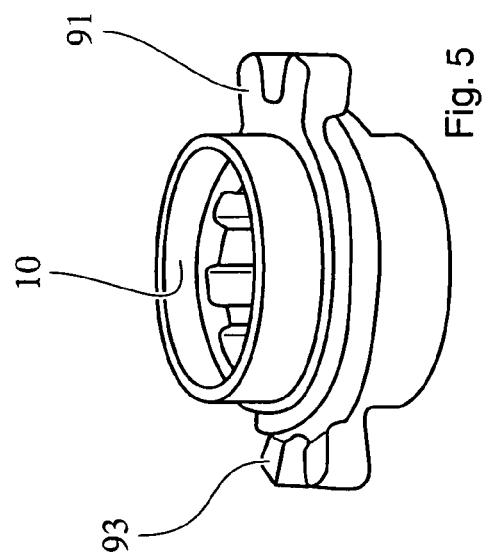

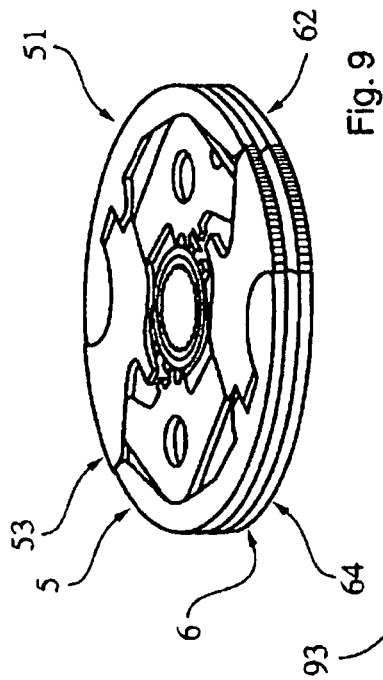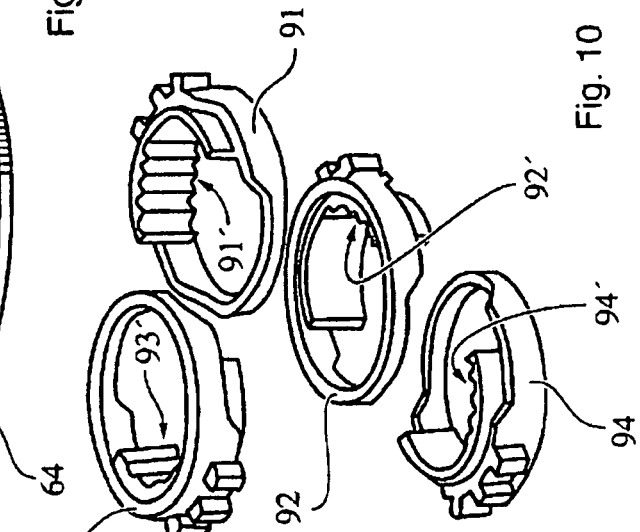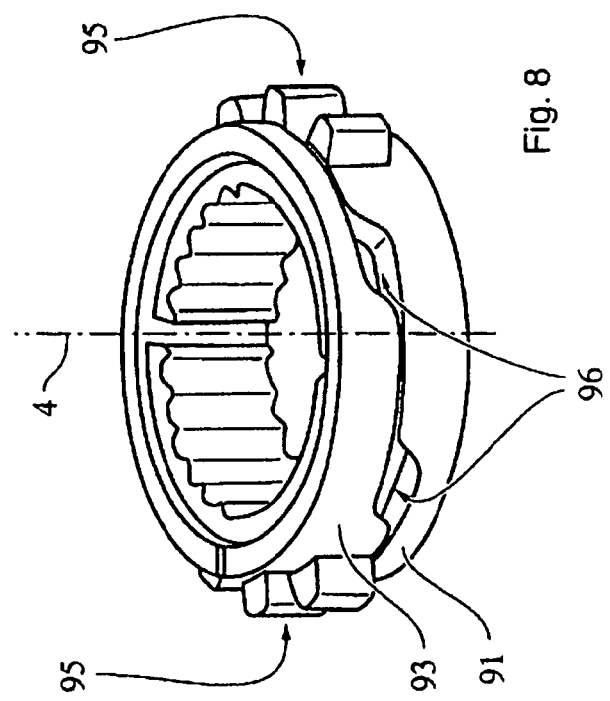

DEVICE FOR LOCKING AND UNLOCKING A FIRST HARDWARE COMPONENT AND A SECOND HARDWARE COMPONENT, PARTICULARLY OF A MOTOR VEHICLE SEAT, RELATIVE TO EACH OTHER

CROSS REFERENCE TO RELATED APPLICATIONS

The present application is a U.S. National Stage of International Application No. PCT/EP2010/002928, filed May 12, 2010, designating the United States, and claiming priority to German Patent Application No. 10 2009 020 953.0, filed May 12, 2009 and German Patent Application No. 10 2009 032 904.8, filed Jul. 10, 2009. The foregoing applications are hereby incorporated herein by reference in their entireties.

The present invention relates to a device for locking and unlocking a first and a second hardware component, particularly in a motor vehicle seat, relative to each other, and in particular for adjusting the relative position of a backrest part of the vehicle seat relative to a seat part of the vehicle seat.

BACKGROUND

A plurality of devices are known for locking and unlocking the inclination adjustment of hardware components, particularly for motor vehicle seats, relative to each other. Such devices, in particular when loaded, have to be able to be unlocked easily and uniformly. When applied to a motor vehicle seat it has to be possible to unlock the device between the seat part and backrest, even when a torque acts on the backrest part. Moreover, such devices have to satisfy high requirements relative to strength and wear resistance, in order to withstand the loads which occur in long-term operation—when used in motor vehicle seats typically over many years and/or approximately 10 years. Moreover, safety requirements have to be fulfilled, in particular self-opening of the device has to be reliably prevented, and it has to withstand loads in the event of an accident. DE 699 08 135 T2 discloses such a device which is arranged in a housing and comprises a retaining and adjustment means as well as a plurality of latching pawls, wherein the retaining and adjustment means is arranged fixedly in terms of rotation on a rotating shaft and is able to be rotated counter to the force of a force means, whereby the latching pawls are unlocked so that the inclination of the hardware components may be adjusted relative to each other.

SUMMARY

It is the object of the present invention to provide a device for locking and unlocking a first hardware component and a second hardware component, particularly for motor vehicle seats, relative to each other, which has improved safety relative to self-opening in the event of an accident, but which may be easily unlocked, which has high strength, which satisfies high requirements relative to the compensation of internal tolerances and which is also able to be small, manufactured cost-effectively and able to be mounted easily and cost-effectively.

The object is achieved by a device for locking and unlocking a first hardware component and a second hardware component, particularly for a motor vehicle seat, relative to each other, wherein the first hardware component and the second hardware component form a housing having an interior and are disposed on a common axis, wherein at least one first latching means is disposed in a first plane perpendicular to the axis, wherein at least one second latching means is disposed in a second plane also perpendicular to the axis and displaced along the axis relative to the first plane, wherein the first latching means comprises a first latching pawl and a first retaining cam and the second latching means comprises a second latching pawl and a second retaining cam.

By the arrangement of the latching means in different planes, in particular two planes and/or four planes, it is possible to distribute the forces acting in the device, so that smaller forces act for each latching means. As a result, it is possible to produce the individual latching means from thinner material. As a result, precision cutting techniques do not have to be used when producing the components. In contrast to normal cutting, in which a workpiece is cut off by shearing, during precision cutting the workpiece is cut off after clamping on all sides. Therefore, in a precision-cut workpiece the cutting surface is to a large extent planar. However, a compromise has to be made in the choice of material, on the one hand, between the flexibility of the material which influences the deviation in shape or deflection of the component and, on the other hand, the force to be applied during precision cutting, wherein the tool and the production process become more expensive where greater forces are required. The edge deformation leads to a reduction in load-bearing capacity so that with a relatively flexible material thermal treatment may be necessary for increasing the strength. As a result of the effort required when clamping the material, the high tool costs and the thermal treatment for tempering the components, producing components by means of precision cutting is expensive. Moreover, the materials which are able to be used are restricted due to the aforementioned compromise. According to the present invention, these drawbacks may be avoided as thinner material may be used for producing the latching means and yet (due to the arrangement in a plurality of planes) a comparatively high load-bearing capacity is possible. If required, a plurality of planes of relatively small material thickness are superimposed in the manner of a laminate (i.e. displaced in parallel along the axis) and to a large extent have the same contour, thus they may be produced using the same shaping tools. As a result, the automated handling of the components in the production process is simple. For example, when producing the components the same machines may be used inexpensively for all elements of a component by retrofitting or even without retrofitting, in particular during normal cutting or laser welding. According to the invention, therefore, production methods are used for producing the elements of the latching means in which less force is required, the tool costs are therefore lower, the cost for clamping the workpieces is lower or is even eliminated and in which in comparison with precision cutting harder materials may also be used. Preferably, the elements of the latching means are produced by means of normal cutting, which advantageously is cost-effective relative to precision cutting and may be carried out at high processing speeds. Also, the tool costs are considerably lower in comparison with precision cutting. The person skilled in the art understands that other cutting methods may also be used which have sufficient processing speed and are cost-effective. Preferably, the elements have the same thickness so that production and storage is particularly simple and cost-effective due to the small number of different types of components. Moreover, the mechanical load-bearing capacity of the component with the same thickness of the elements may be very easily scaled by the number of superimposed elements and/or the number of planes. In a preferred embodiment, the elements are made of steel, particularly preferably from high-strength steel. Thus in comparison with the materials able to be used in precision cutting this results in a marked reduction in weight.

According to the invention, it is particularly preferred that the device comprises a first transmission means which is rotatable about the axis and a second transmission means which is rotatable about the axis, wherein the first transmission means is operatively connected to the first retaining cam and wherein the second transmission means is operatively connected to the second retaining cam. As a result, dimensional tolerances which inevitably occur during production of the individual parts of the device according to the invention, and in particular require a variable angular position of the retaining cams, may be separately compensated for each latching means. As a result, the requirements for dimensional accuracy of the various individual parts of the overall device may be reduced, so that the production costs may be reduced.

According to the invention, it is further preferred that the device in the first plane comprises a third latching means and that the device in the second plane comprises a fourth latching means, wherein the third latching means comprises a third latching pawl and a third retaining cam and the fourth latching means comprises a fourth latching pawl and a fourth retaining cam, wherein in particular the device comprises a third transmission means which is rotatable about the axis and a fourth transmission means which is rotatable about the axis, wherein the third transmission means is operatively connected to the third retaining cam and wherein the fourth transmission means is operatively connected to the fourth retaining cam. According to the invention, therefore, in each case it is possible to arrange in a simple manner two (or three or four or more) latching means in two planes of the device spaced apart in parallel and perpendicular to the axis, so that a locking force (in particular in the case of an accident) is transmitted to the largest possible regions of locking teeth present, which is why the material thickness of each individual latching means may be reduced for the purpose of a simplified and more cost-effective production of the individual parts. The adjustment of the relative position of the hardware components about the axis is in each case ensured in a redundant manner by the presence of at least two latching means and/or a plurality of latching means in the same plane, so that the device is additionally improved relative to safety as regards self-opening in the event of an accident. Moreover, the device may be locked in an improved manner in the event of loads from different preferred loading directions. The different latching means are particularly preferably constructed symmetrically within one plane, so that (in spite of a higher number of individual parts) a lower number of different parts (and/or a greater number of identical parts) results, which as a whole reduces the production costs of the device. Moreover, by the symmetrical configuration of the latching means within one plane substantially symmetrical forces act in the direction of the axis so that the overall load is distributed over a greater region of the components and/or a greater number of components (and/or the forces are partially compensated) and the components—with the same overall load-bearing capacity—may have smaller dimensions or may be able to be produced from less expensive material.

According to the invention, it is further preferred that the first and third transmission means are designed as identical parts and/or that the second and fourth transmission means are designed as identical parts, wherein in particular the first and third transmission means and/or the second and fourth transmission means are installed in the device, oriented opposite one another with one respective corresponding side. As a result, it is possible in a simple manner to produce the device according to the invention by an increased number of identical parts in a particularly cost-effective manner.

Moreover, according to the invention, it is also preferred that the latching means may be moved by rotating an actuating means about the axis in a first rotational direction into a locked position and by rotating the actuating means about the axis in a second rotational direction opposing the first rotational direction into an unlocked position, wherein the first and second hardware components are latched relative to one another in the locked position relative to rotation about the axis and are rotatable about the axis in the unlocked position. The actuation of the locking and unlocking device and/or the device according to the invention may thus take place in a particularly simple manner and in particular with a particularly small actuating path, whereby an improvement in comfort during operation of the device may be achieved. In a preferred embodiment, the first hardware component is connected to a first positive and/or non-positive connection means, in particular a first locking tooth, and the second hardware component is connected fixedly in terms of rotation to the plurality of latching pawls, which in each case comprise a second positive and/or non-positive connection means, in particular a second locking tooth, wherein the first positive and/or non-positive connection means and the second positive and/or non-positive connection means are connected in the locked position, in particular are in engagement with one another and not connected in the unlocked position, in particular are not in engagement with one another. Teeth are preferred as first and second positive and/or non-positive connection means. According to the invention, naturally also the first hardware component is connected fixedly in terms of rotation to the plurality of latching pawls (and thus the second positive and/or non-positive connection means) and the second hardware component to the first positive and/or non-positive connection means.

According to the invention, it is particularly preferred, moreover, that the first and second transmission means or the first, second, third and fourth transmission means in each case is connected fixedly in terms of rotation to the actuating means by means of a transmission structure, wherein the transmission structure is provided, in particular, in the form of an internal serration in each case. As a result, it is advantageously possible that the latching means are always arranged in a defined position relative to one another and are able to be adjusted together by means of the actuating means and namely always starting from the same (initial) relative arrangement to one another. As a result, the latching means may also be arranged on very small area relative to one another so that during adjustment they do not hinder one another. A further particular advantage may also be achieved by means of such a design as the (possibly different) internal tolerance positions of the plurality of latching means may be compensated by simple means independently of one another. As a result, the synchronization of a plurality of latching means may be implemented in a simple manner—whether it is a plurality of latching means within the same device according to the invention or between a plurality of devices according to the invention (in particular two) coupled together, for example attached to two external sides of a motor vehicle seat, provided for adjusting the motor vehicle seat and devices connected together via a rotating actuating shaft. Preferably, the actuating means comprises a bushing (for example made of plastics material or even of a relatively easily deformable material such as a metal material) to which the transmission structure of the plurality of transmission means in each case is connected fixedly in terms of rotation (in particular positively).

Preferably, the device comprises in each case a mechanical energy storage device (common to all latching means) or a plurality of energy storage devices for one or more latching means, wherein the energy storage device or the energy storage devices acts/act on the latching pawls and/or the retaining cams of the plurality of latching means and pretensions/pretension the latching means in their respective locked position. The unlocked position is then able to be adjusted counter to the action of the force of the energy storage device or the energy storage devices.

According to the invention, it is further preferred that the transmission structure is distributed over the periphery of the actuating means such that a connection which is fixed in terms of rotation between the actuating means, on the one hand, and in each case the first and second transmission means or the first, second, third and fourth transmission means, on the other hand, may be effected about the axis in the respective angular position of the transmission means. As a result, a decoupling of the component tolerances of the different latching means may be implemented such that when assembling the device (i.e. initially) the transmission means (depending on tolerance conditions between the individual parts (locking pawl/retaining cam/transmission means) of the latching means) are arranged in different positions and held in this initial position by the non-positive and/or positive cooperation between the actuating means (in particular a bushing of the actuating means) and the transmission structure. Particularly preferably, moreover, in the installed position of the first and second transmission means, the transmission structures of the first and second transmission means are positioned on the periphery of the actuating means without overlapping, wherein the transmission structures extend in each case, in particular, over less than 180° of the periphery and/or it is preferred that in the installed position of the first, second, third and fourth transmission means the transmission structures of the first, second, third and fourth transmission means are positioned on the periphery of the actuating means without overlapping, wherein the transmission structures extend in each case, in particular, over less than 90° of the periphery. In this manner, according to the invention in a simple manner it is possible that when the actuating means are assembled (in particular, when the bushing of the actuating means is pressed in, such that said bushing is plastically deformed by the transmission structures) this does not result in the different latching means affecting one another.

According to the invention, it is further preferred that the latching pawls and the retaining cams of the latching means are designed in each case as identical parts. As a result, the production costs of the device according to the invention may be further reduced.

According to the invention, it is further preferred that the transmission means are operatively connected in each case to the retaining cams by means of a transmission means tooth and a retaining cam tooth, wherein the retaining cams in each case are rotatable about a further axis which is spaced apart from the axis, for adjusting the locked position and the unlocked position of the latching means. As a result, even with a slight alteration of the position of the transmission means and/or the retaining cam relative to the latching means a more secure engagement may be ensured and when unlocking the device a uniform unlocking sensation may be imparted to the user.

BRIEF DESCRIPTION OF THE DRAWINGS

The figures show by way of example and schematically different embodiments of the invention. The descriptions do not restrict the general inventive idea.

FIGS. 1, 3 and 4 show schematic views of a device according to the invention in the opened state (i.e. without a part of the housing) and/or a detailed view.

FIG. 2 shows a schematic side view of a vehicle seat.

FIGS. 5 to 8 and 10 to 12 show different embodiments of transmission means for devices according to the present invention.

FIGS. 9 and 13 show different views of different embodiments of latching means.

DETAILED DESCRIPTION

Figure 3:
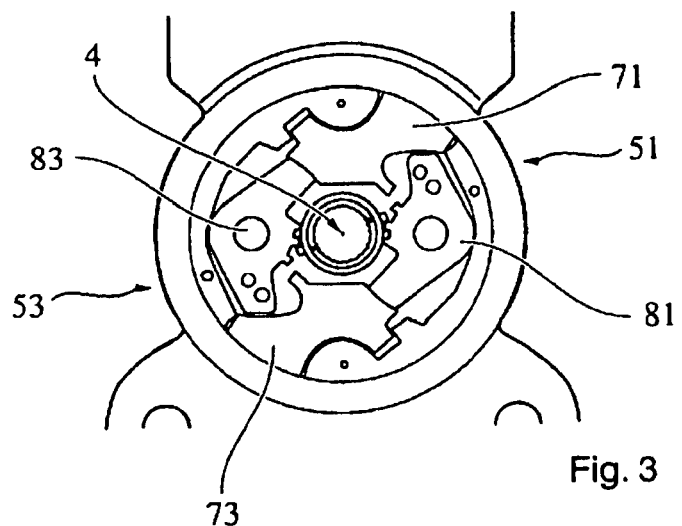

FIG. 1 shows a schematic view of a device 1 according to the invention in the opened state, i.e. without a part of the housing. The device 1 according to the invention is used, in particular, in a vehicle seat 13 shown schematically in a side view in FIG. 2, in particular for the inclination adjustment of a seat part 11 relative to a backrest part 12 of the vehicle seat 13. To this end, the device 1 according to the invention and/or adjustment device 1 comprises a first hardware component 2 and a second hardware component 3 which are arranged to be rotatable and/or pivotable about a common axis 4 relative to one another and form a housing having an interior 9. In FIG. 1 the inner surface 9' of the first hardware component 2 is visible, at least partially surrounding the interior 9. A first latching means 51 and a third latching means 53 are arranged in the interior 9 of the housing in a first plane 5. The first latching means 51 has a first latching pawl 71 and a first retaining cam 81. The third latching means 53 has a third latching pawl 73 and a third retaining cam 83. According to the exemplary embodiment shown in the figures of the device 1 according to the invention, said device also comprises a second plane 6 in addition to the first plane 5. The second plane 6 comprises a second latching means 62 and a fourth latching means 64. The second latching means 62 comprises a second latching pawl 72 and a second retaining cam 82. The fourth latching means 64 comprises a fourth latching pawl 74 and a fourth retaining cam 84.

According to the invention at least two planes 5, 6 are present and each plane has at least one latching means. This means that at least the first latching means 51 and the second latching means 62 are present.

Figure 4:
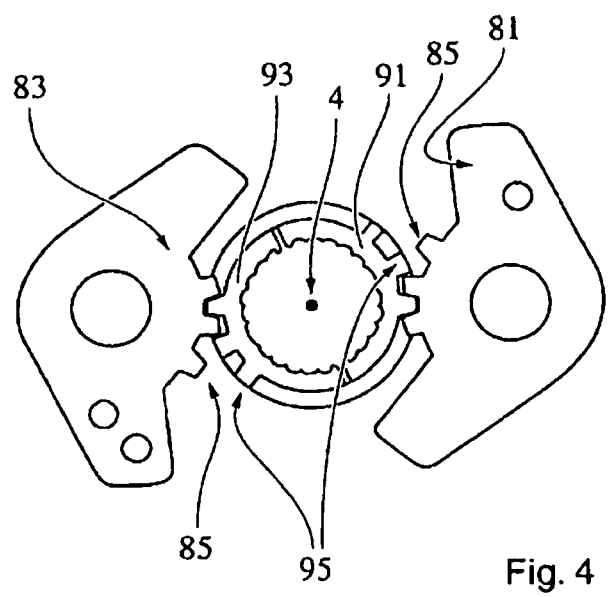

Preferably, however, according to the present invention (and shown exclusively in the figures) in each of the at least two planes (at least) two latching means, namely the first and third latching means 51, 53, are present in the first plane 5 and the second and fourth latching means 62, 64 are present in the second plane 6. In FIG. 3, a further view of the device 1 according to the invention (and/or its first plane 5) is shown and in FIG. 4 a detailed view of a part of two latching means 51, 53, 62, 64 arranged in one of the planes 5, 6 is shown, wherein for the sake of simplicity reference is made to the first plane and the first and third latching means 51, 53. It is visible from FIG. 4 that the first retaining cam 81 may be moved by means of a first transmission means 91 and the third retaining cam 83 may be moved by means of a third transmission means 93. The same also applies to the second latching means 62 and the fourth latching means (not shown in each case), i.e. the second retaining cam 82 may be moved by means of a second transmission means 92 and the fourth retaining cam 84 may be moved by means of a fourth transmission means 94. In this case, the transmission means 91, 92, 93, 94 and the retaining cams 81, 82, 83, 84 in each case comprise teeth meshing with one another, which as a whole are denoted as retaining cam teeth 85 and/or as transmission means teeth 95.

In FIGS. 5 to 13, different embodiments are now shown, in particular of the transmission means 91, 92, 93, 94. According to FIG. 6 one transmission means is shown and according to FIG. 8 two transmission means 91, 93 and/or 92, 94 are shown which in each case are provided for the latching means 51, 53 and/or 62, 64 of one plane 5, 6. The transmission means 91, 93 and/or 92, 94 are configured according to the invention, in particular as identical parts. In the installed situation, for example, for the first plane 5 the third transmission means 93 is positioned rotated by 180° relative to the first transmission means 91, wherein corresponding surfaces are oriented opposing one another and/or bearing against one another. By means of recesses 96, according to the invention it is possible that the transmission means (in the example of FIG. 8 the first and third transmission means 91, 93, but the same also applies to the second plane 6 and the second and fourth transmission means 92, 94) may be adjusted relative to one another in different rotational positions about the axis 4. As a result, a compensation of tolerances may be achieved, wherein the different latching means 51, 53, 62, 64 are completely independent of one another relative to tolerance compensation. The transmission means 91, 92, 93, 94 further comprise (on the inner face thereof which faces the axis 4) in each case a transmission structure 91', 92', 93', 94'. By means of the transmission structure 91', 92', 93', 94' the transmission means 91, 92, 93, 94 are connected fixedly in terms of rotation to one another and to an actuating means 10 which is shown in FIGS. 5 and 7 together with two transmission means 91, 93. The transmission structure 93', which is clearly visible in FIG. 6, of the third transmission means 93 is connected fixedly in terms of rotation to the actuating means 10 (in particular by pressing into a bushing of the actuating means 10). As a result, the transmission structure 93' intersects a partial region of the actuating means 10 and this results in a relative fixing of the position.

Figure 13:
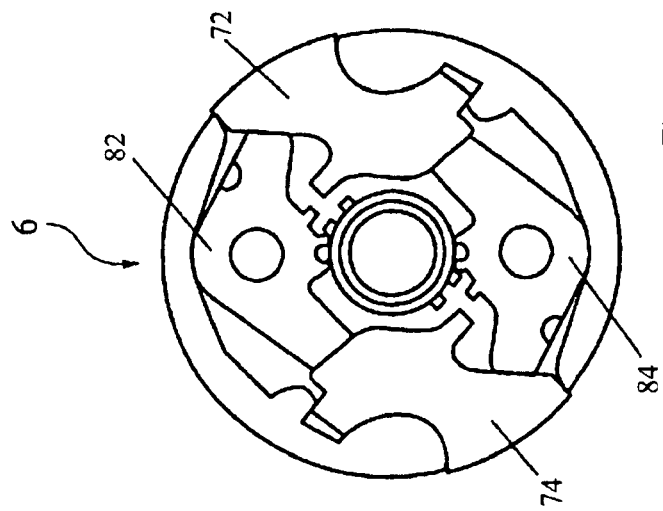
Figure 12:
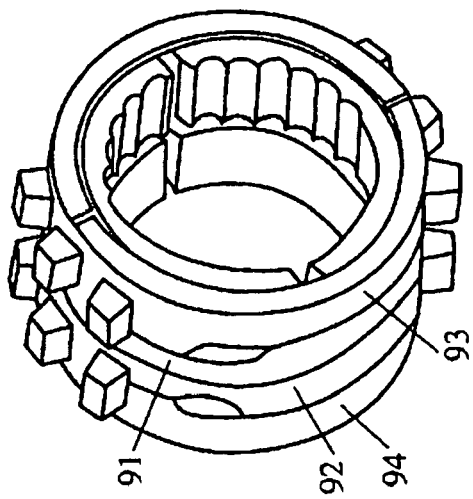
Figure 11:
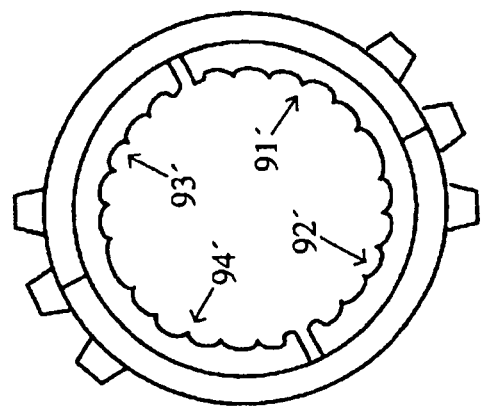

The embodiment of the transmission structure 91', 92', 93', 94' according to FIGS. 5, 6 and 7 differs from the embodiment according to FIGS. 8 to 13. In the embodiment according to FIGS. 8 to 13, the transmission structure 91', 92', 93', 94' of each individual transmission means 91, 92, 93, 94 is merely provided on a peripheral region (of the inner periphery of the transmission means 91, 92, 93, 94 and/or of the periphery of the actuating means 10) of slightly less than 90°. As a result, this does not lead to an overlap of the transmission structures 91', 92', 93', 94' on the periphery so that the relative positions of the transmission means 91, 92, 93, 94 to be fixed (and compensating for the respective tolerance situation in the respective latching means 51, 53, 62, 64) do not influence one another when the actuating means 10 is pressed in. In FIG. 9, the two planes 5, 6 of the device 1 according to the invention as well as the latching means 51, 53, 62, 64 may be seen particularly clearly. In FIG. 10, the four different transmission means 91, 92, 93, 94 for providing two planes 5, 6 are shown in an exploded view. It is particularly clear from this that the transmission structures 91', 92', 93', 94' in each case are formed only over approximately 90° (and/or possibly less). In FIG. 11 the transmission structures 91', 92', 93', 94' are visible particularly clearly by means of the view parallel to the extension of the axis 4. In FIG. 12 the transmission means 91, 92, 93, 94 are shown in a perspective view in their installed situation. In FIG. 13, a plan view of the second plane 6 is shown. The same plan view of FIG. 13 applies to the first plane 5.

For details of the shape of the latching pawls 71, 72, 73, 74 and the retaining cams 81, 82, 83, 84 relative to one another and for the view of a mechanical force storage device for pretensioning the latching means 51, 53, 62, 64 in their locked position, the disclosure of the German publication DE 10 2004 047 420 B4 is incorporated in the present disclosure by reference.

LIST OF REFERENCE NUMERALS

1 Device
2 First hardware component
3 Second hardware component
4 Axis
5 First plane
6 Second plane
9 Interior
9' Inner surface of first hardware component
10 Actuating means
11 Seat part
12 Backrest part
13 Vehicle seat
51 First latching means
53 Third latching means
62 Second latching means
64 Fourth latching means
71 First latching pawl
72 Second latching pawl
73 Third latching pawl
74 Fourth latching pawl
81 First retaining cam
82 Second retaining cam
83 Third retaining cam
84 Fourth retaining cam
85 Retaining cam teeth
91 First transmission means
92 Second transmission means
93 Third transmission means
94 Fourth transmission means
91', 92', 93', 94' Transmission structure
95 Transmission means tooth

The invention claimed is:

1. A device for locking and unlocking a first hardware component and a second hardware component relative to each other, wherein the first hardware component and the second hardware component form a housing having an interior and are disposed on a common axis, comprising:
at least one first latching device disposed in a first plane perpendicular to the common axis;
at least one second latching device disposed in a second plane also perpendicular to the common axis and displaced along the common axis relative to the first plane;
a first transmission device rotatable about the common axis;
a second transmission device rotatable about the common axis;
a third latching device in the first plane;
a fourth latching device in the second plane;
a third transmission device which is rotatable about the common axis; and
a fourth transmission device which is rotatable about the common axis,
wherein the first latching device comprises a first latching pawl and a first retaining cam, the second latching device comprises a second latching pawl and a second retaining cam, the third latching device comprises a third latching pawl and a third retaining cam, and the fourth latching device comprises a fourth latching pawl and a fourth retaining cam,
wherein the first transmission device is configured to be movable relative to the first retaining cam so as to be operatively connected to the first retaining cam, the second transmission device is configured to be movable relative to the second retaining cam so as to be operatively connected to the second retaining cam, the third transmission device is configured to be movable relative to the third retaining cam so as to be operatively connected to the third retaining cam, and the fourth transmission device is configured to be movable relative to the fourth retaining cam so as to be operatively connected to the fourth retaining cam, wherein the first, second, third, and fourth latching devices are rotatable by rotating an actuating device about the common axis in a first rotational direction into a locked position and by rotating the actuating device about the common axis in a second rotational direction opposing the first rotational direction into an unlocked position, wherein the first and second hardware components are configured to be latched relative to one another in the locked position relative to a rotation about the common axis and are configured to be rotatable about the common axis in the unlocked position, wherein the first, second, third and fourth transmission devices are each connected fixedly in terms of rotation to the actuating device by a corresponding first, second, third, and fourth transmission structure, wherein the first, second, third, and fourth transmission structures of the first, second, third, and fourth transmission devices each comprise a plurality of internal serrations, wherein the first and second transmission structures of the first and second transmission devices are distributed over a periphery of the actuating device such that rotatably fixed connections between the actuating device and the first and second transmission devices are configured to be effected about the common axis in respective angular positions of the first and second transmission devices, wherein the periphery of the actuating device is deformed by the internal serrations of the first transmission structure of the first transmission device to create the rotatably fixed connection between the actuating device and the first transmission device in an installed position of the first transmission device, wherein the internal serrations of the first transmission structure deform the periphery of the actuating device only in a portion of a first region of the periphery that extends along the entire periphery in the direction of the common axis, wherein the periphery of the actuating device is deformed by the internal serrations of the second transmission structure of the second transmission device to create the rotatably fixed connection between the actuating device and the second transmission device in an installed position of the second transmission device, wherein the internal serrations of the second transmission structure deform the periphery of the actuating device only in a portion of a second region of the periphery that extends along the entire periphery in the direction of the common axis, wherein, in the installed positions of the first and second transmission devices, the internal serrations of the first transmission structure and the internal serrations of the second transmission structure are positioned on the periphery of the actuating device without overlapping such that the first region does not overlap with the second region, wherein the first and second transmission structures of the first and second transmission devices extend in each case over less than 180° of the periphery of the actuating device wherein the first, second, third, and fourth transmission devices are operatively connected to the first, second, third and fourth retaining cams, respectively, by a transmission device tooth and a retaining cam tooth in each case, wherein the first, second, third, and fourth retaining cams are rotatable in each case about a further axis spaced apart from the common axis, for adjusting the locked position and the unlocked position of the first, second, third, and fourth latching devices, respectively, wherein the first, second, third, and fourth latching devices are completely independent of one another to compensate for internal tolerance positions of the latching devices, wherein the first, second, third, and fourth transmission structures of the first, second, third, and fourth transmission devices are each provided on a peripheral region of the inner periphery of the respective transmission devices of slightly less than 90°.

2. The device as claimed in claim 1, wherein (a) the first and third transmission devices are designed as identical parts, or (b) the second and fourth transmission devices are designed as identical parts.

3. The device as claimed in claim 1, wherein the transmission structures of the first, second, third, and fourth transmission devices are distributed over the periphery of the actuating device such that rotatably fixed connections between the actuating device and the first, second, third, and fourth transmission devices are configured to be effected about the common axis in respective angular positions of the first, second, third, and fourth transmission devices.

4. The device as claimed in claim 1, wherein the transmission structures of the first, second, third, and fourth transmission devices are distributed over the periphery of the actuating device such that rotatably fixed connections between the actuating device and the first, second, third, and fourth transmission devices are configured to be effected about the common axis in respective angular positions of the first, second, third, and fourth transmission devices, wherein in the installed position of the first, second, third and fourth transmission devices, the transmission structures of the first, second, third and fourth transmission devices are positioned on the periphery of the actuating device without overlapping, and wherein the transmission structures of the first, second, third, and fourth transmission devices extend in each case over less than 90° of the periphery of the actuating device.

5. The device as claimed in claim 1, wherein the first, second, third, and fourth latching pawls are designed in each case as identical parts, and wherein the first, second, third, and fourth retaining cams are designed in each case as identical parts.

6. The device as claimed in claim 1, wherein the first and third transmission devices are designed as identical parts, and wherein the second and fourth transmission devices are designed as identical parts.

7. The device as claimed in claim 1, wherein (a) the first and third transmission devices are installed in the device oriented opposite one another with one respective corresponding side or (b) the second and fourth transmission devices are installed in the device oriented opposite one another with one respective corresponding side.

8. The device as claimed in claim 1, wherein the first and third transmission devices are installed in the device oriented opposite one another with one respective corresponding side, and
wherein the second and fourth transmission devices are installed in the device oriented opposite one another with one respective corresponding side.

9. A motor vehicle seat, comprising:
a device as claimed in claim 1;
a seat part having the first hardware component; and
a backrest part having the second hardware component,
wherein the first latching device and the second latching device are arranged in the interior of the housing.

* * * * *